United States Patent
Lazzara

(10) Patent No.: US 8,249,760 B2
(45) Date of Patent: Aug. 21, 2012

(54) VEHICLE REMOTE STARTER USING AN ELECTRONIC IGNITION MODULE EMULATOR

(75) Inventor: Robert K. Lazzara, Chicago, IL (US)

(73) Assignee: PSI Patents, LLC, Chicago, IL (US)

( * ) Notice: Subject to any disclaimer, the term of this patent is extended or adjusted under 35 U.S.C. 154(b) by 0 days.

(21) Appl. No.: 13/271,389

(22) Filed: Oct. 12, 2011

(65) Prior Publication Data

US 2012/0029734 A1 Feb. 2, 2012

Related U.S. Application Data

(63) Continuation of application No. 13/123,734, filed as application No. PCT/US2010/023185 on Feb. 4, 2010, now abandoned.

(60) Provisional application No. 61/149,824, filed on Feb. 4, 2009.

(51) Int. Cl.
*G06F 7/00* (2006.01)
*B60R 22/00* (2006.01)

(52) U.S. Cl. ............... 701/2; 307/10; 307/6; 340/8.64; 340/539.1; 180/287

(58) Field of Classification Search ............... 701/2, 36; 307/10.6; 340/531, 425.5, 426.13, 426.16
See application file for complete search history.

(56) References Cited

U.S. PATENT DOCUMENTS

| 6,208,919 | B1 | 3/2001 | Barkesseh et al. |
| 6,529,124 | B2 * | 3/2003 | Flick ........................ 340/426.1 |
| 6,700,220 | B2 | 3/2004 | Bayeur et al. |
| 7,205,679 | B2 | 4/2007 | Flick |
| 2001/0029415 | A1 * | 10/2001 | Flick ............................... 701/36 |
| 2005/0197106 | A1 | 9/2005 | Bristow et al. |
| 2009/0079552 | A1 * | 3/2009 | Flick ......................... 340/426.17 |

(Continued)

FOREIGN PATENT DOCUMENTS

CA 2741093 A1 * 8/2010

(Continued)

OTHER PUBLICATIONS

Remote vehicle state of health monitoring and its application to vehicle no-start prediction; Yilu Zhang; Salman, M.; Subramania, H.S.; Edwards, R.; Correia, J.; Gantt, G.W.; Rychlinksi, M.; Stanford, J.; AUTOTESTCON, 2009 IEEE; Digital Object Identifier: 10.1109/AUTEST.2009.5314011; Publication Year: 2009, pp. 88-93.*

(Continued)

*Primary Examiner* — Cuong H Nguyen
(74) *Attorney, Agent, or Firm* — Adam K. Sacharoff

(57) ABSTRACT

A remote starter system for a vehicle having an electronic ignition module connected to vehicle controller modules by a serial data interface. The electronic ignition module is capable of receiving at least one keycode from a cryptographic controller vehicle key for verification before changing the state of at least one vehicle controller module. The remote starter system is defined in one embodiment to include a remote starter module having at least a memory for storing at least one keycode and having the ability to send the at least one keycode for verification and the ability to request modification of a state of at least one vehicle controller module. Wherein when the at least one keycode is verified, the state of at least one vehicle controller module is modified as requested by the remote starter module.

10 Claims, 13 Drawing Sheets

U.S. PATENT DOCUMENTS

| | | | | |
|---|---|---|---|---|
| 2011/0205017 A1* | 8/2011 | Lazzara | ........................ | 340/5.64 |
| 2011/0251736 A1* | 10/2011 | Lazzara | ............................ | 701/2 |
| 2012/0029733 A1* | 2/2012 | Lazzara | ............................ | 701/2 |
| 2012/0029734 A1* | 2/2012 | Lazzara | ............................ | 701/2 |

FOREIGN PATENT DOCUMENTS

| | | | |
|---|---|---|---|
| CA | 2741092 C | * | 5/2012 |
| WO | WO 2010085557 A1 | * | 7/2010 |

OTHER PUBLICATIONS

A DC Signal Injection-Based Thermal Protection Scheme for Soft-Starter-Connected Induction Motors; Pinjia Zhang; Yi Du; Bin Lu; Habetler, T.G.; Industry Applications, IEEE Transactions on; vol. 45 , Issue: 4; Digital Object Identifier: 10.1109/TIA.2009.2023410; Publication Year: 2009 , pp. 1351-1358.*

A Remote and Sensorless Stator Winding Resistance Estimation Method for Thermal Protection of Soft-Starter-Connected Induction Machines; Pinjia Zhang; Bin Lu; Habetler, T.G.; Industrial Electronics, IEEE Transactions on; vol. 55 , Issue: 10 Digital Object Identifier: 10.1109/TIE.2008.927241; Publication Year: 2008 , pp. 3611-3618.*

A Remote and Sensorless Thermal Protection Scheme for Soft-Starter-Connected Induction Motors; Pinjia Zhang; Yi Du; Bin Lu; Habetler, T.G.; Industry Applications Society Annual Meeting, 2008. IAS '08. IEEE; Digital Object Identifier: 10.1109/08IAS.2008.48 Publication Year: 2008 , pp. 1-7.*

Low power control systems for microbial fuel cell batteries; Tyce, R.; Critz, K.; Book, J.W.; Tender, L.; OCEANS 2008 Digital Object Identifier: 10.1109/OCEANS.2008.5151990; Publication Year: 2008 , pp. 1-7.*

Photon-counting chip for avalanche detectors; F. Zappa; A. Lotito; S. Tisa; Photonics Technology Letters, IEEE vol. 17 , Issue: 1; Digital Object Identifier: 10.1109/LPT.2004.838136; Publication Year: 2005 , pp. 184-186.*

Design & implementation of ARM based data acquisition system; Shaik, M.I.; Electronics, Communication and Computing Technologies (ICECCT), 2011 International Conference on; Digital Object Identifier: 10.1109/ICECCT.2011.6077066 Publication Year: 2011 , pp. 38-42.*

* cited by examiner

VEHICLE REMOTE STARTER USING AN ELECTRONIC IGNITION MODULE EMULATOR

CROSS REFERENCE TO RELATED APPLICATIONS

The present application is a continuation application of U.S. patent application Ser. No. 13/123,734 filed Apr. 12, 2011, which claims priority to international application of PCT/US10/23185 filed Feb. 4, 2010 which claims priority to U.S. Provisional Application 61/149,824 filed Feb. 4, 2009. All of which are herein incorporated by reference

FIELD OF THE INVENTION

The present invention relates to the field of automotive convenience starters, also known as remote engine starters, and more particularly to an intelligent electronic ignition module emulator that allows the electronic ignition systems of a vehicle to be controlled over the vehicle network for the purpose of remotely starting the vehicle engine and controlling additional systems such as the Heater/Air conditioning.

BACKGROUND OF THE INVENTION

Vehicle remote starters are a common and valuable possession for many vehicle owners. The remote starter system allows the vehicle owner that lives in a climate that is unusually warm or cold to start their engine for a predetermined amount of time and allow the vehicle interior temperature to stabilize to a comfortable level. Vehicle remote starters historically consisted of an electronics module that connects into the vehicle at various points and controls various vehicle functions by applying voltage to discrete wires to control various aspects of the vehicle operation. For example, a wire might be connected to the heater or air conditioning supply line and when voltage is applied the heater or air conditioning unit will activate and begin to climate control the vehicle interior. Furthermore, the majority of vehicles produced after the model year 1995 incorporate an additional security measure known as an immobilizer. The immobilizer is a system that is comprised of a small cryptographic controller built into the vehicle key and an electronic reader that is built into the vehicle key cylinder. The purpose of the immobilizer system is to create an additional layer of vehicle security above the physical key by requiring that the vehicle electronic systems verify that the correct vehicle key is present and authorized via an electronic keycode exchange.

The installation of the remote starter is typically performed by a technician that routes the individual wires from the remote starter module to each target wire that corresponds to a circuit in the vehicle that requires control. These wires are then connected to the target circuit using a variety of methods, but most typically the process used is to remove a small section of the insulation covering the wire and then soldering the remote starter wire to the target wire using heat and a lead based solder. Additionally the vehicle immobilizer system is bypassed by means of physically placing either an authorized vehicle key which contains the aforementioned cryptographic controller inside the vehicle or by placing an additional authorized cryptographic controller inside the vehicle. The cryptographic controller is electrically coupled to the electronic reader in the vehicle key cylinder such that when the engine is commanded to start with the remote starter system, the cryptographic controller will present a valid keycode to the vehicle electronic systems which in turn allow the engine to start.

The remote starter system described above exhibits two deficiencies that prevent its use in many modern vehicles. The first deficiency relates to the proliferation of electronic networks in modern vehicles: A modern vehicle dispenses with the discreet wiring previously described and instead uses serial data lines to convey data and changes in the vehicle state to other parts of the vehicle. A serial data line is a single or multiple wire connection that presents information as a series of voltage pulses related by time. Common types of vehicle serial data protocols are canbus, flexray, most, linbus, and rs232. For example, in the prior art description the heater or air conditioning system, engine, starter, and accessories circuits each had a single discrete wire that convey data by simply changing voltage state: The presence of voltage on the wire would indicate that the circuit was active. A vehicle with a serial data system will instead combine or multiplex those signals, each conveying a different vehicle state or item of data along with hundreds or even thousands of other signals onto one or two wires. Newer vehicles utilize a system comprised of many electronic controllers interconnected using one or more vehicle networks. Such a system will include an electronic ignition module which relates changes in the vehicle operating state, an electronic engine controller, which controls the engine operation as well as other controllers which control the state of the vehicle transmission, the heater, air conditioning, and other systems. Any change in vehicle state (for example to start and run the vehicle engine) is coded as data which is transmitted across the vehicle network. This modern networked vehicle can no longer use the older discretely wired remote starter systems but rather require a new type of remote starter system which actuates any change in vehicle state by directly modifying data which is normally passed along the vehicle network. While some prior art exists relating to reading or writing data items on the vehicle network for the purpose of implementing a vehicle remote starter, this is deficient for the purposes of the stated invention as existing data which is sent between various modules on the network must actually be filtered and modified. All prior art lacks this ability as the described systems only connect to the network but lack the ability to filter or modify existing data.

The second deficiency relates to the required placement in the vehicle of a dedicated cryptographic controller as part of the immobilizer system. This requirement creates both economic and security impracticalities in that the cryptographic controller is typically expensive and the vehicle owner must either supply or purchase the controller which must the permanently reside in the vehicle to allow the engine to be remote started. Since the cryptographic controller always remains in the vehicle, a security risk is also created as a thief given the information that the vehicle has a remote starter system installed knows that the vehicle immobilizer system can be defeated simply by locating the cryptographic controller that must be located somewhere in the vehicle.

SUMMARY OF THE INVENTION

The embodiments of the described invention solves one or more of the aforementioned problems by employing an electronic ignition module emulator which is installed on the vehicle network such that all data communicated on the networks between the vehicle electronic ignition module and all other electronic modules on the vehicle networks are routed through the electronic ignition module emulator for the purpose of controlling the various vehicle subsystems to affect the remote starting of the vehicle engine, control of the heater/air conditioner, etc. Furthermore, the invention allows the vehicle to be remote started without the need of the additional separate cryptographic controller (the immobilizer) by means of periodically requesting keycodes from the existing cryptographic controller which is built into the owners key and the storing these keycodes for future use.

This can be described by referencing the drawing in FIG. 1. FIG. 1 describes a modern vehicle ignition system, T-Harness, and the embodied invention: the electronic ignition module emulator or remote starter system. The system is comprised of an electronic ignition module (20), the vehicle key with cryptographic controller (24), power wires (21), and serial data wires (22). In this system, the ignition cylinder is actually an electronic device: The key cylinder still controls switches but these switches are then read by an electronic microcontroller which then translates the signals to data packets that are sent along the serial data lines to various other electronic devices throughout the vehicle. An example of one such device is the engine controller (33). Under normal operation, the ignition module (20) senses the key (24) is turned and requests a valid keycode from the cryptographic controller built into the key (24). The ignition module (20) then sends the valid keycode as well as data that indicates "Start the engine" along the serial data lines. The engine controller (33) then receives this data and correspondingly starts the engine.

The use of serial data lines to transfer data around the vehicle allows the remote starter system to be easily installed in the vehicle using the embodied invention. As all data is transmitted along the serial data lines, the remote starter module can be inserted at only one point along the serial data line and allow the remote starter module to receive and send all necessary information needed to operate the vehicle and start the engine. Again referring to FIG. 1, note the presence of the electronic ignition module emulator (remote starter) (25). The serial data T-Harness (23) routes the serial data lines from the electronic ignition cylinder to the remote starter module (25). Additionally the serial data T-Harness (23) routes signals from the remote starter module (25) to other modules in the vehicle (33-36). The embodied invention works by acting to emulate the functions of the ignition cylinder module (20). During a normal engine start cycle as described in the above paragraph, the invention remains passive until the user has starter the vehicle engine. Once the vehicle engine is running, the remote starter (25) emulates the electronic ignition cylinder module (20) and requests additional keycodes from the vehicle key (24) which is inserted in the ignition. The remote starter (25) then stores these keycodes in its non-volatile memory for use when a remote engine start is requested.

When the user requests a vehicle remote start, the remote starter module (25) now emulates the electronic ignition cylinder module (20) by modifying the data sent from the ignition cylinder module (20). For example when the vehicle key is not inserted in the ignition cylinder, the electronic ignition cylinder module is not sending a valid keycode, and is sending vehicle state data that indicates "engine is off". In the embodied invention, this data is now always routed through the electronic ignition module emulator (remote starter) (25) which now filter out the data which indicates "engine is off" and modifies it to "start the engine". Additionally the remote starter (25) transmits a keycode which was previously stored. This modified data is then routed out to the vehicle network where it is received by all other modules (33-36). When the engine controller (33) reads the data, it believes it has received valid data directly from the electronic ignition cylinder module and starts the engine.

Numerous advantages and features of the invention will become readily apparent from the following detailed description of the invention and the embodiments thereof, and from the accompanying drawings.

BRIEF DESCRIPTION OF THE DRAWINGS

A fuller understanding of the foregoing may be had by reference to the accompanying drawings, wherein.

DETAILED DESCRIPTION OF THE EMBODIMENTS

Figure 1:
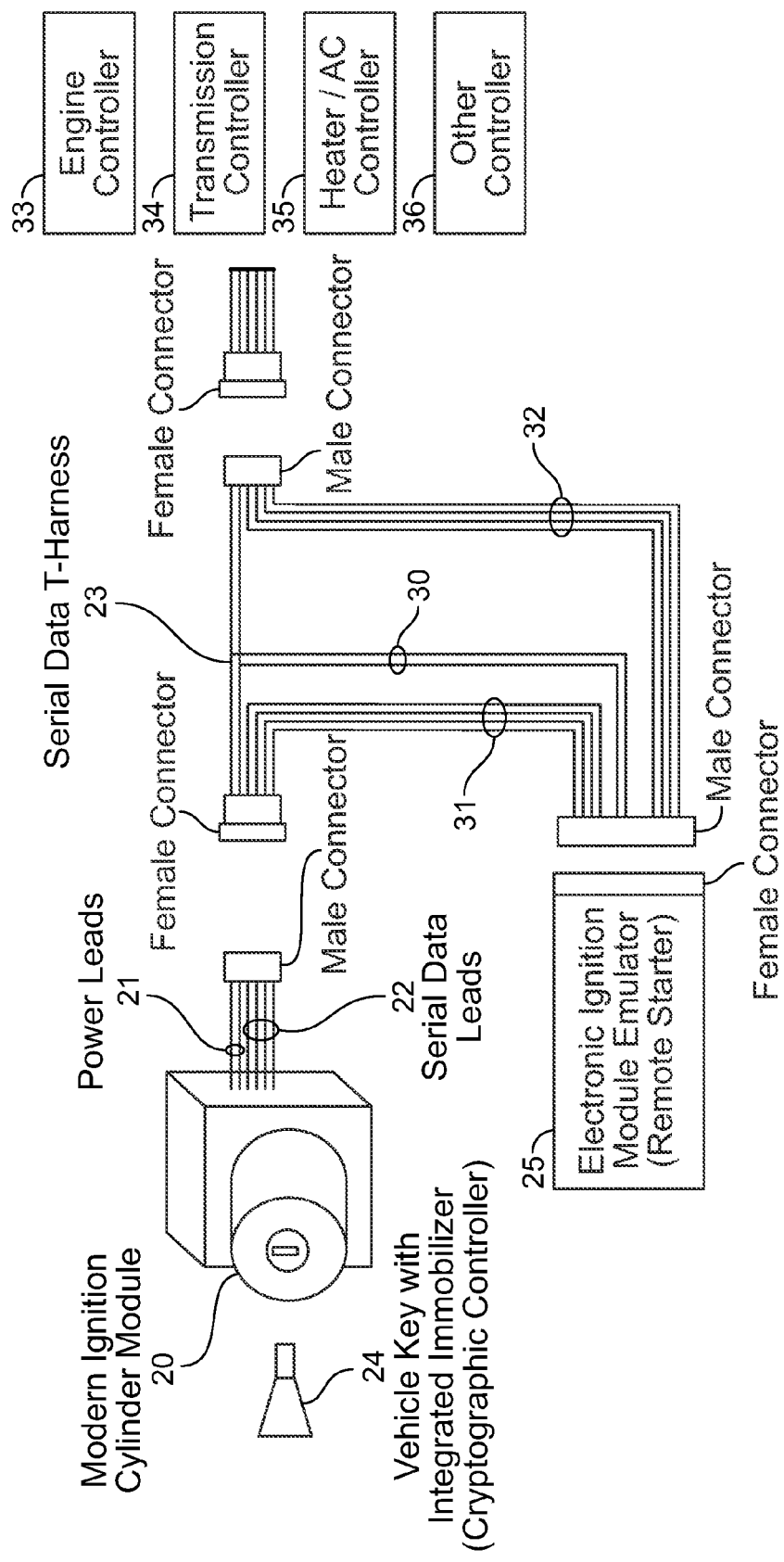
FIG. 1 is a drawing of the embodied invention as well as the operation and its related connections into a modern vehicle.

While the invention is susceptible to embodiments in many different forms, there are shown in the drawings and will described herein, in detail, the preferred embodiments of the present invention. It should be understood, however, that the present disclosure is to be considered an exemplification of the principles of the invention and is not intended to limit the spirit or scope of the claims by the embodiments illustrated.

Figure 2:
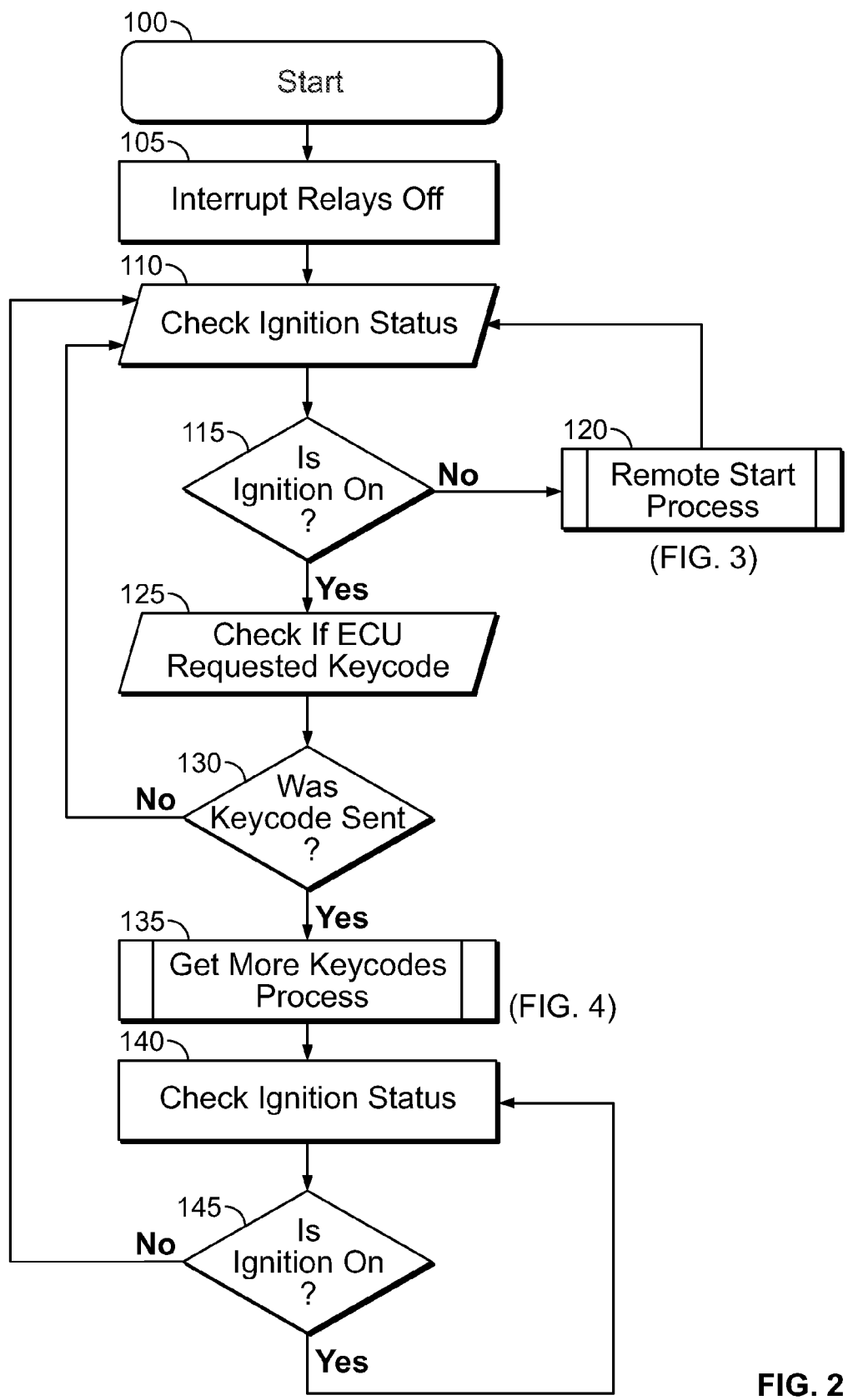
FIG. 2 is a block diagram illustrating functional aspects of a remote starter system in accordance to one embodiment of the present invention.
Figure 3A:
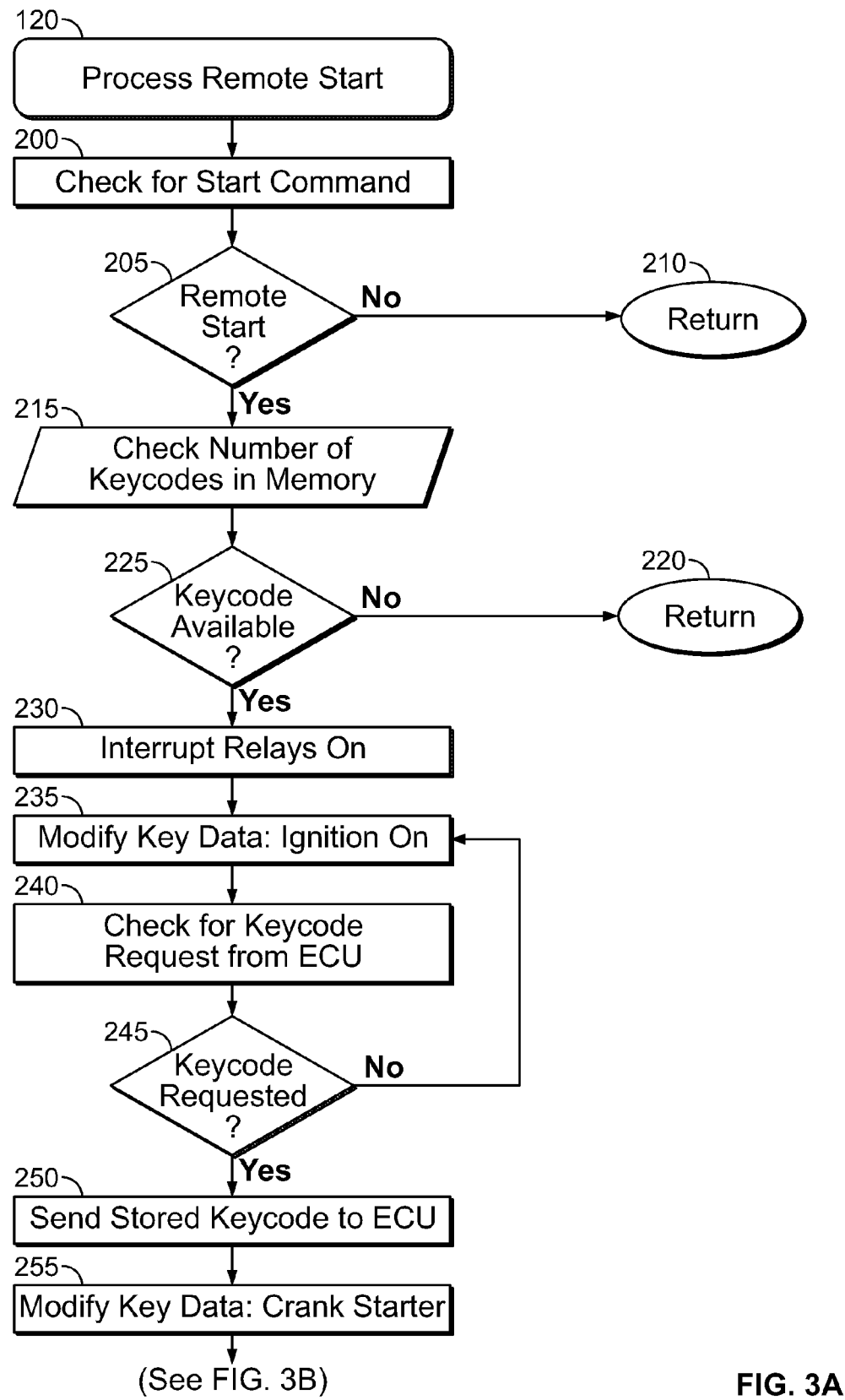
FIG. 3A is a block diagram of a subroutine used in FIG. 2.
Figure 3B:
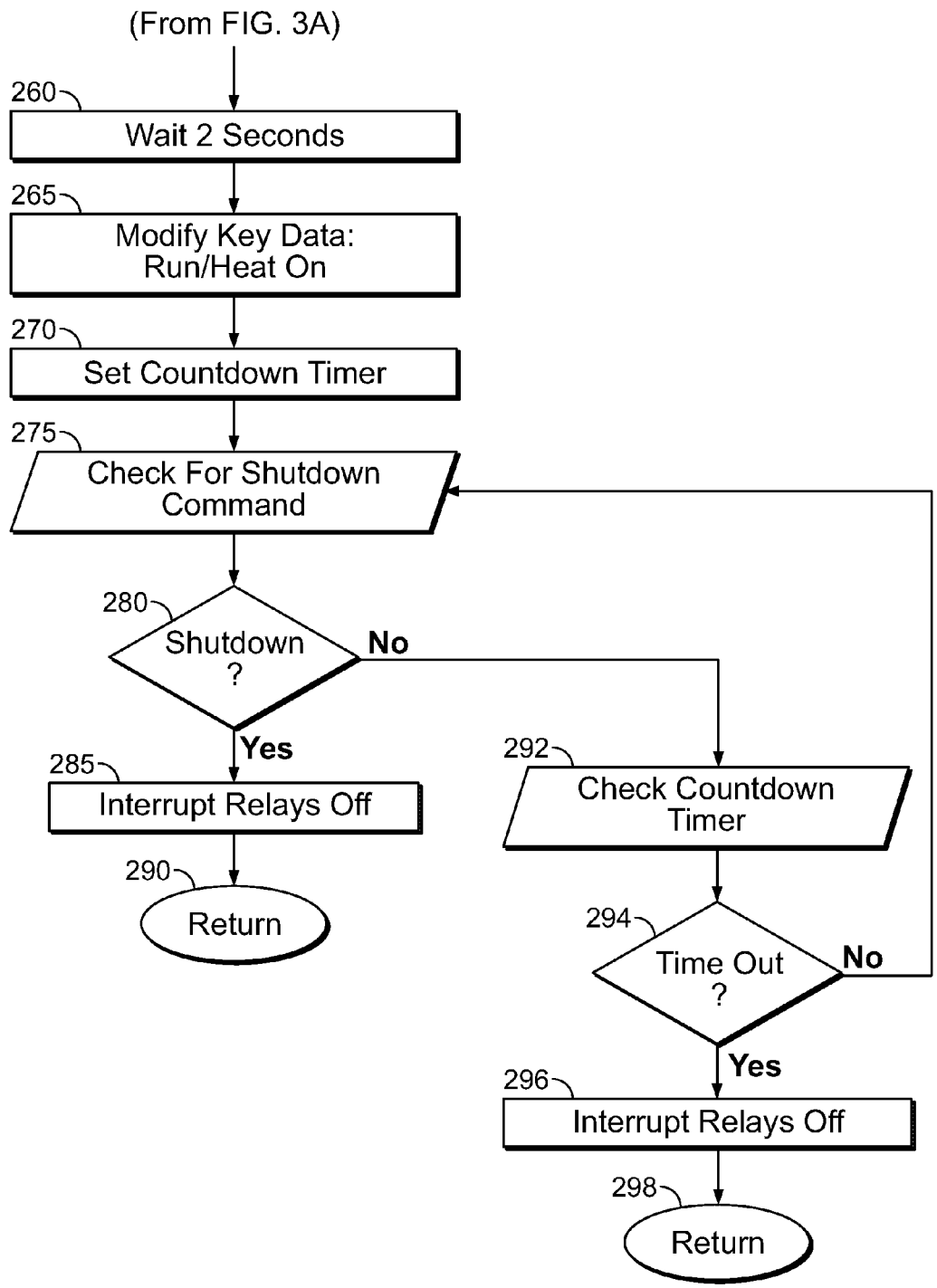
FIG. 3B is a block diagram of a subroutine used in FIG. 2.
Figure 4:
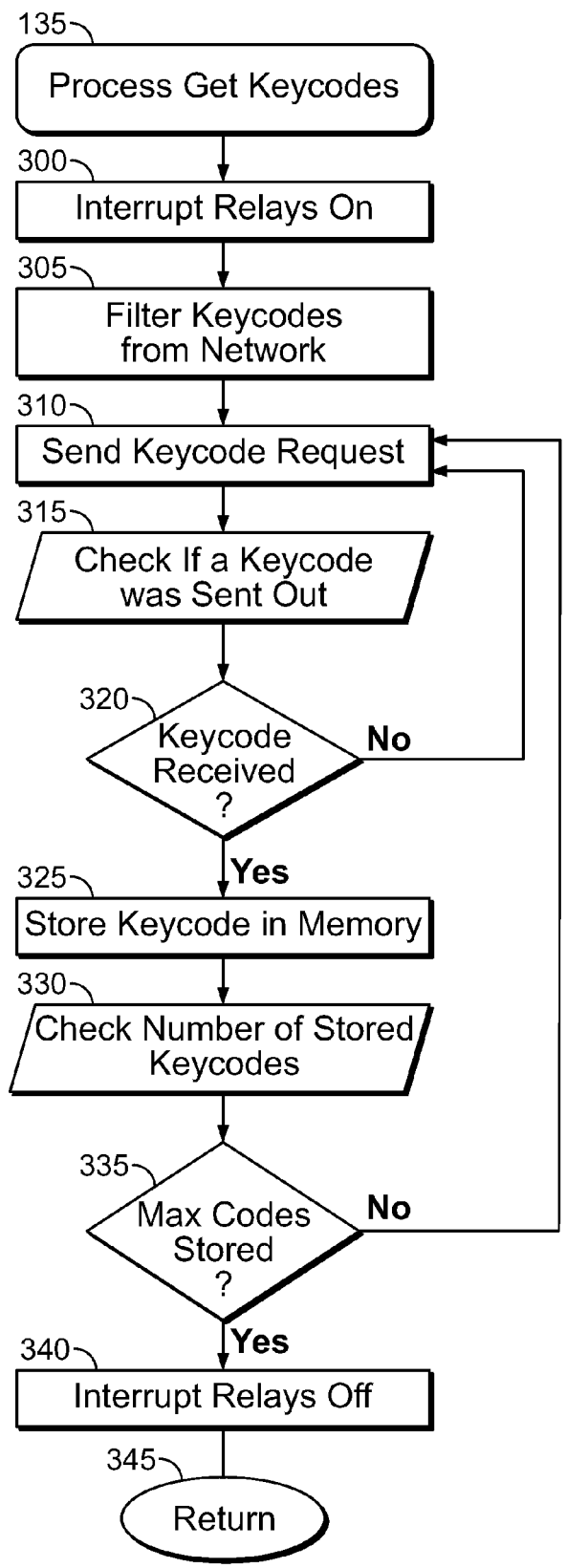
FIG. 4 is a block diagram of a subroutine used in FIG. 2.
Figures 1, 5A:
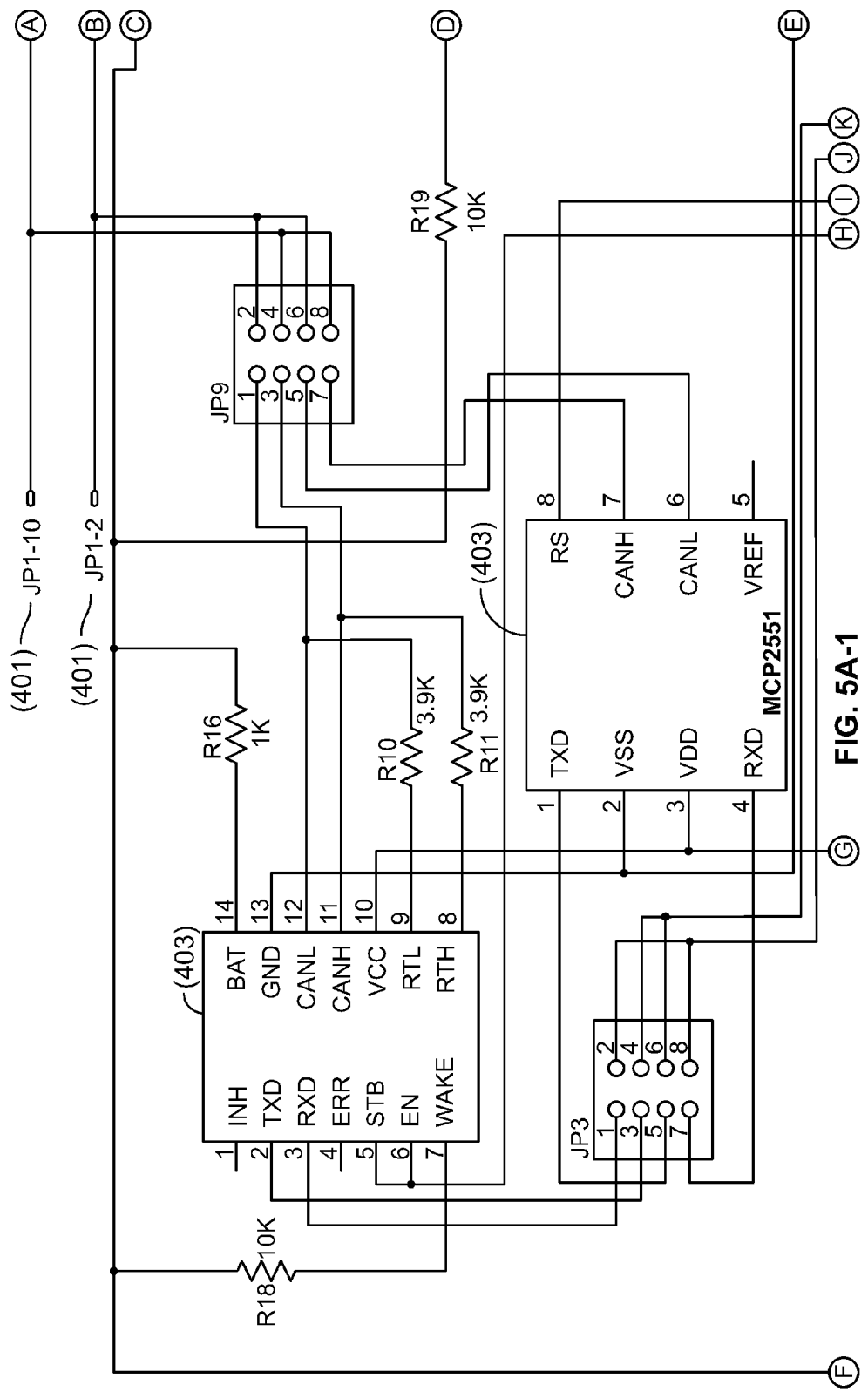
FIGS. 5A and 5B are an electric schematic of a processor used by a remote starter system in accordance to an embodiment of the present invention.
Figures 2, 5A:
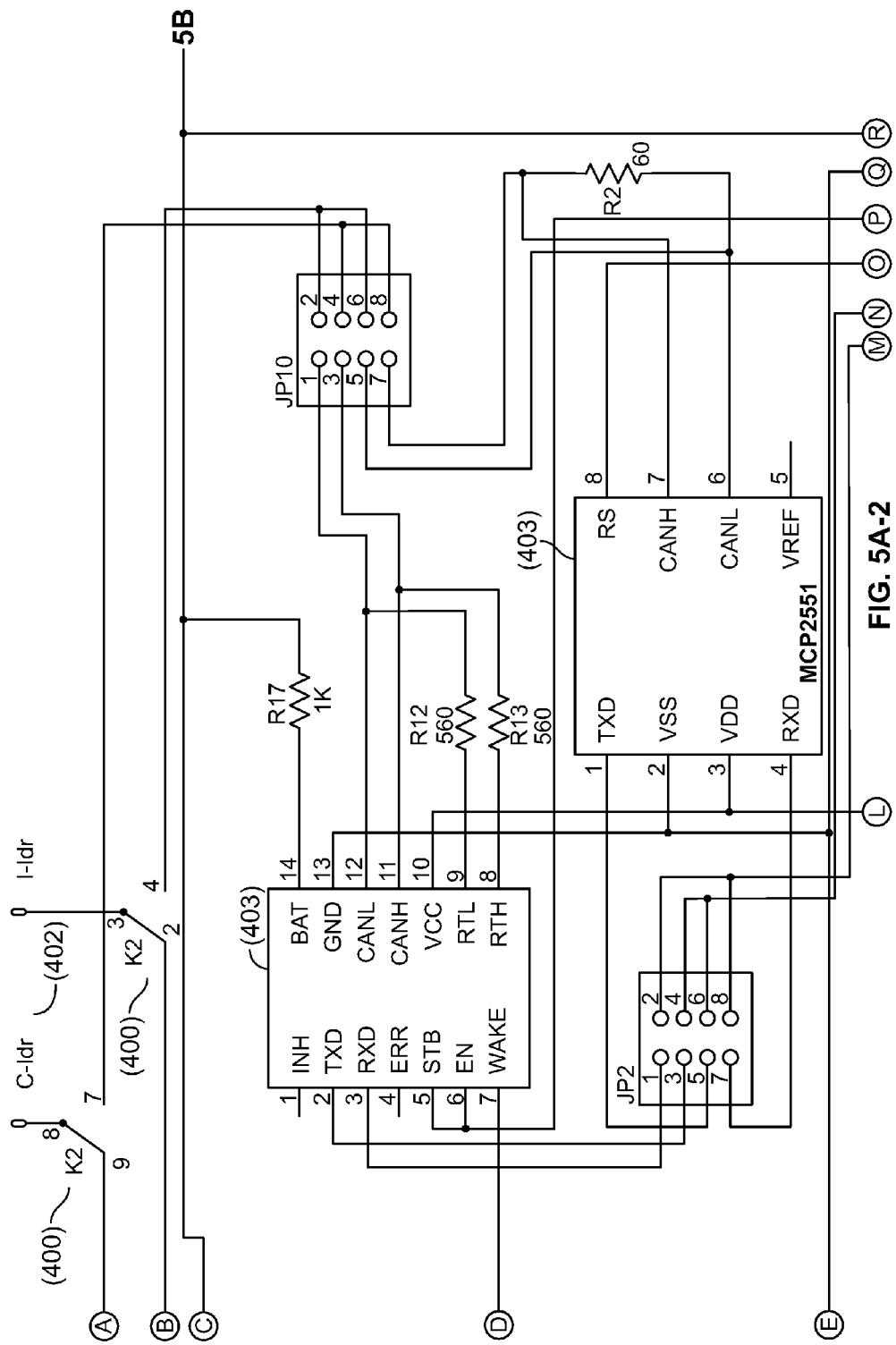
Figures 3, 5A:
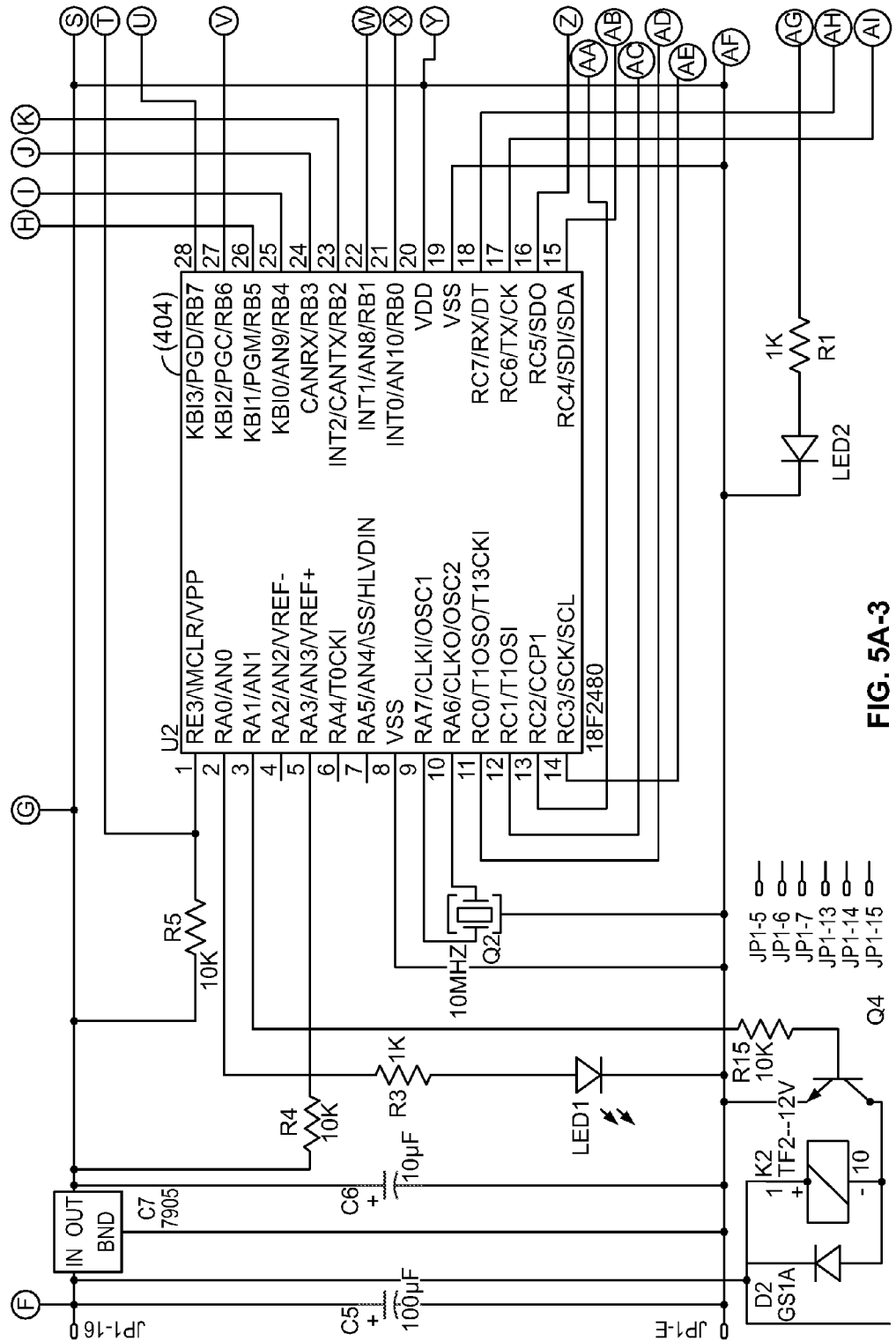
Figures 4, 5A:
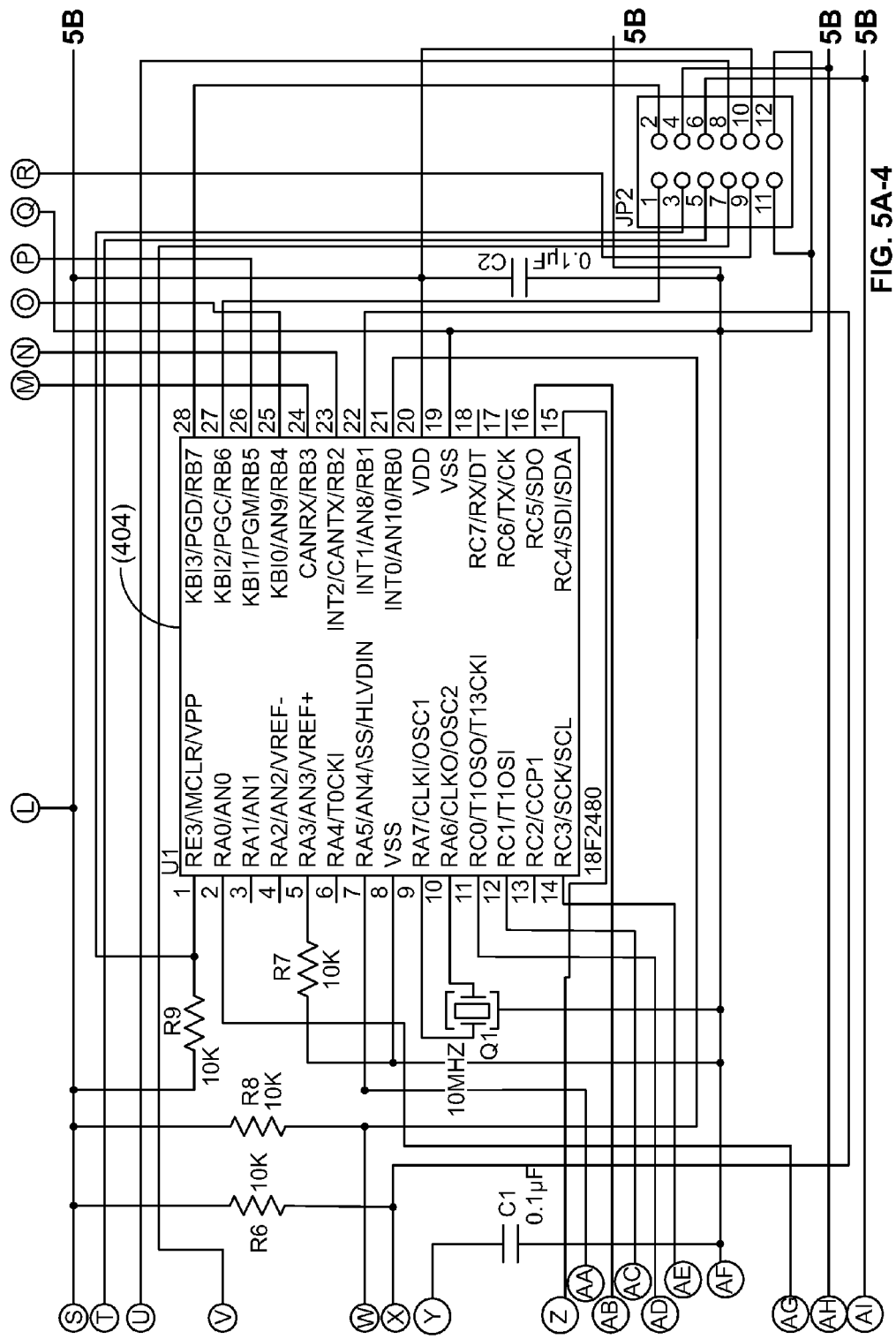
Figures 1, 5B:
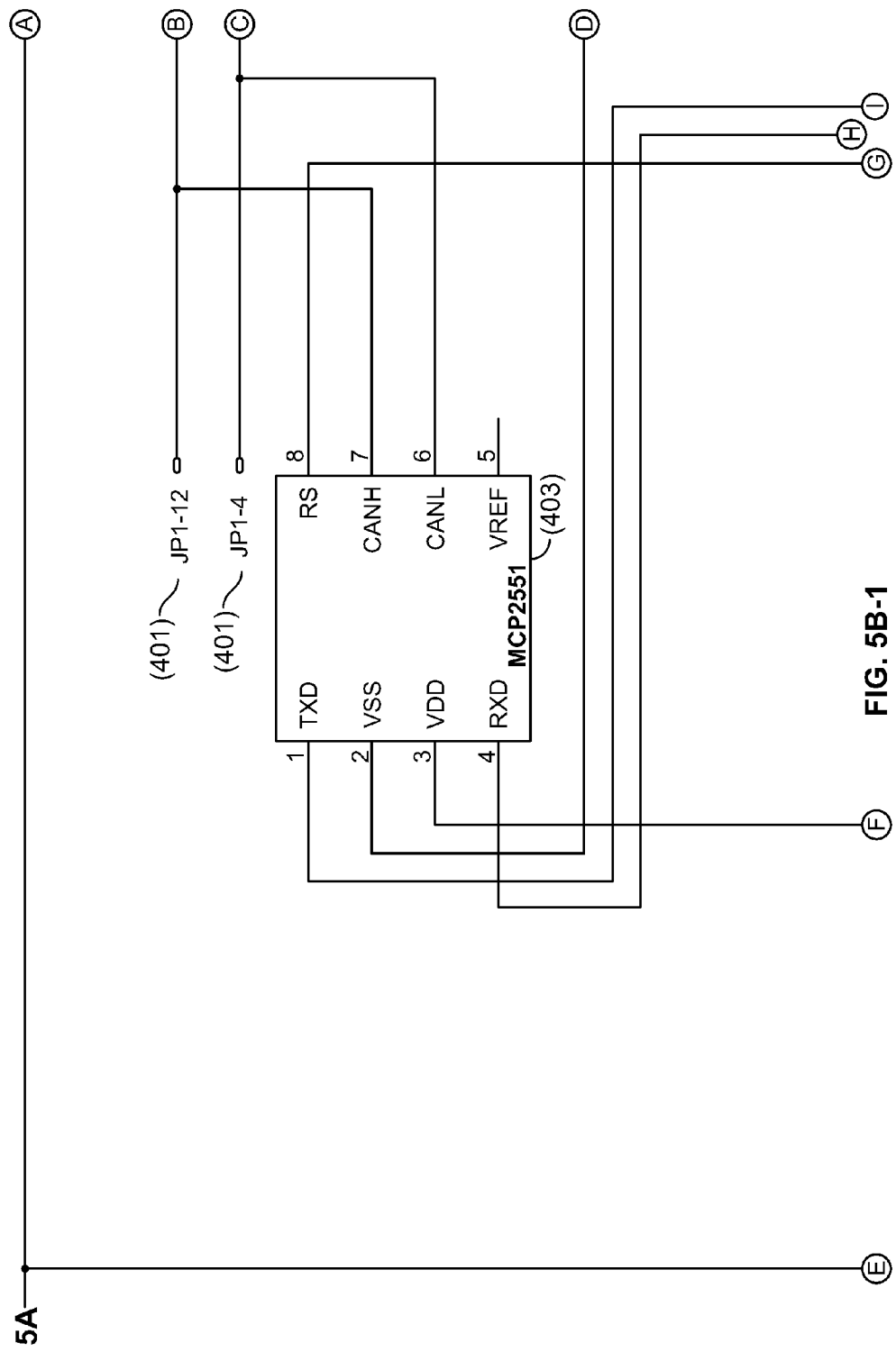
Figures 2, 5B:
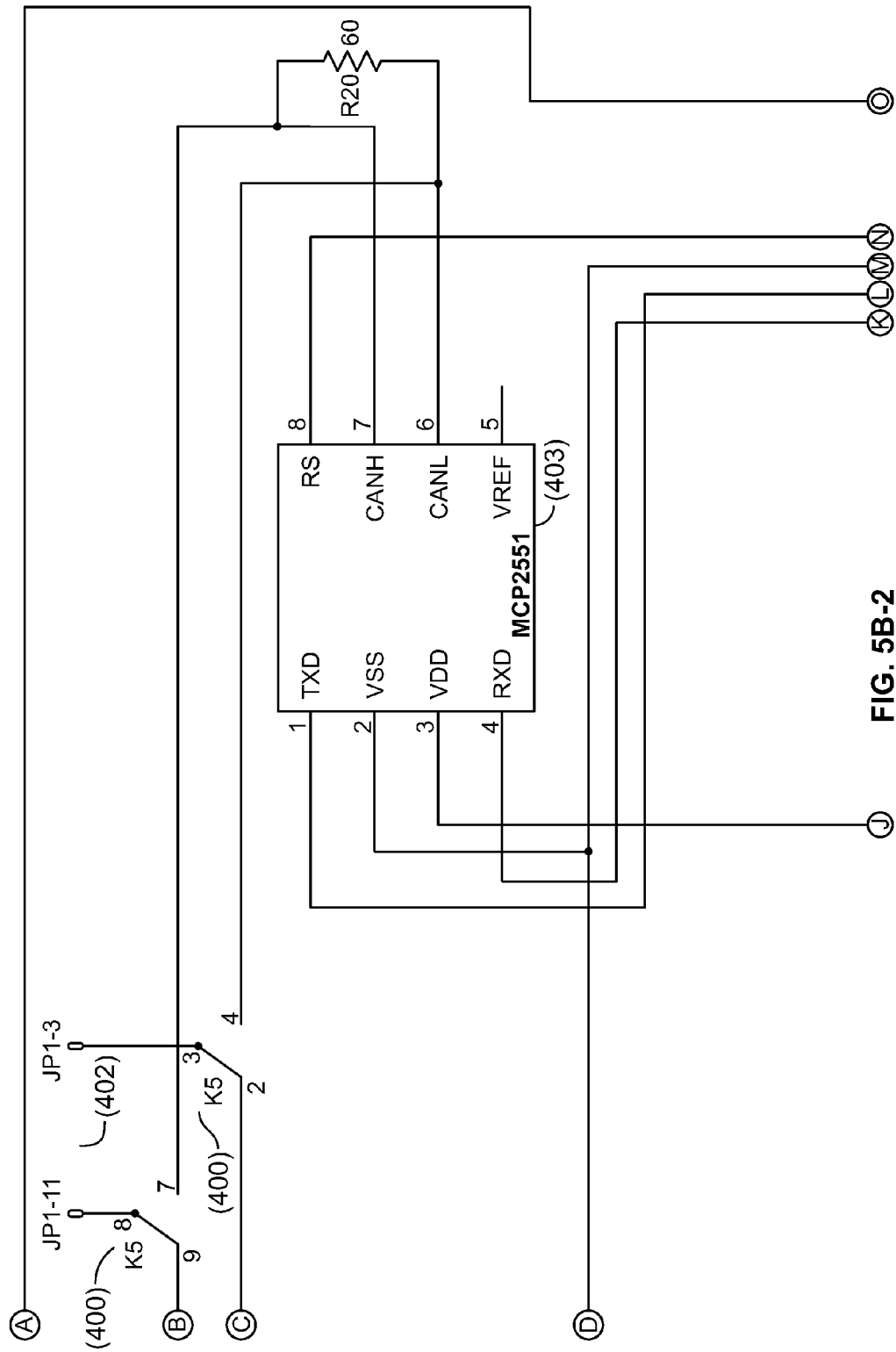
Figures 3, 5B:
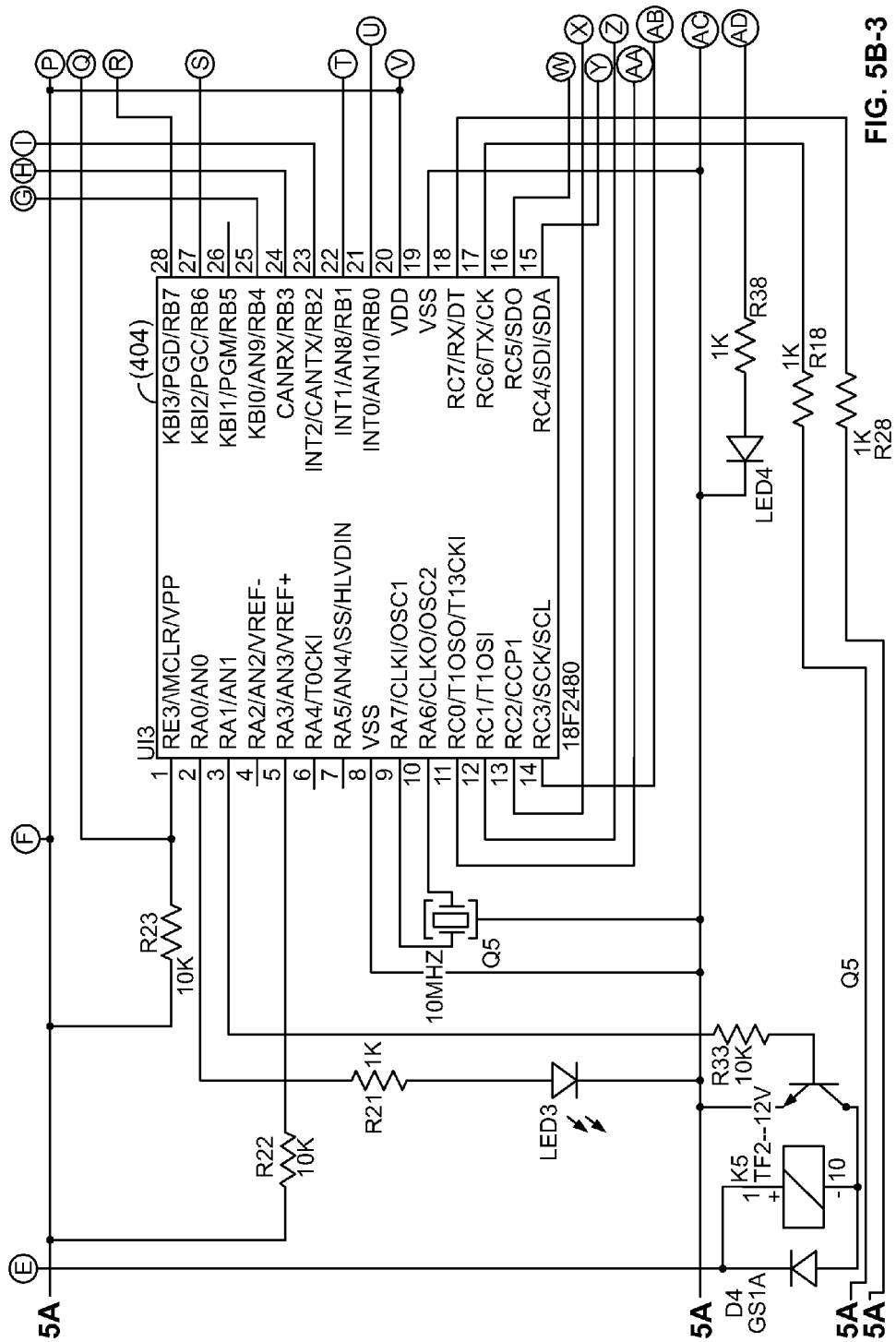
Figures 4, 5B:
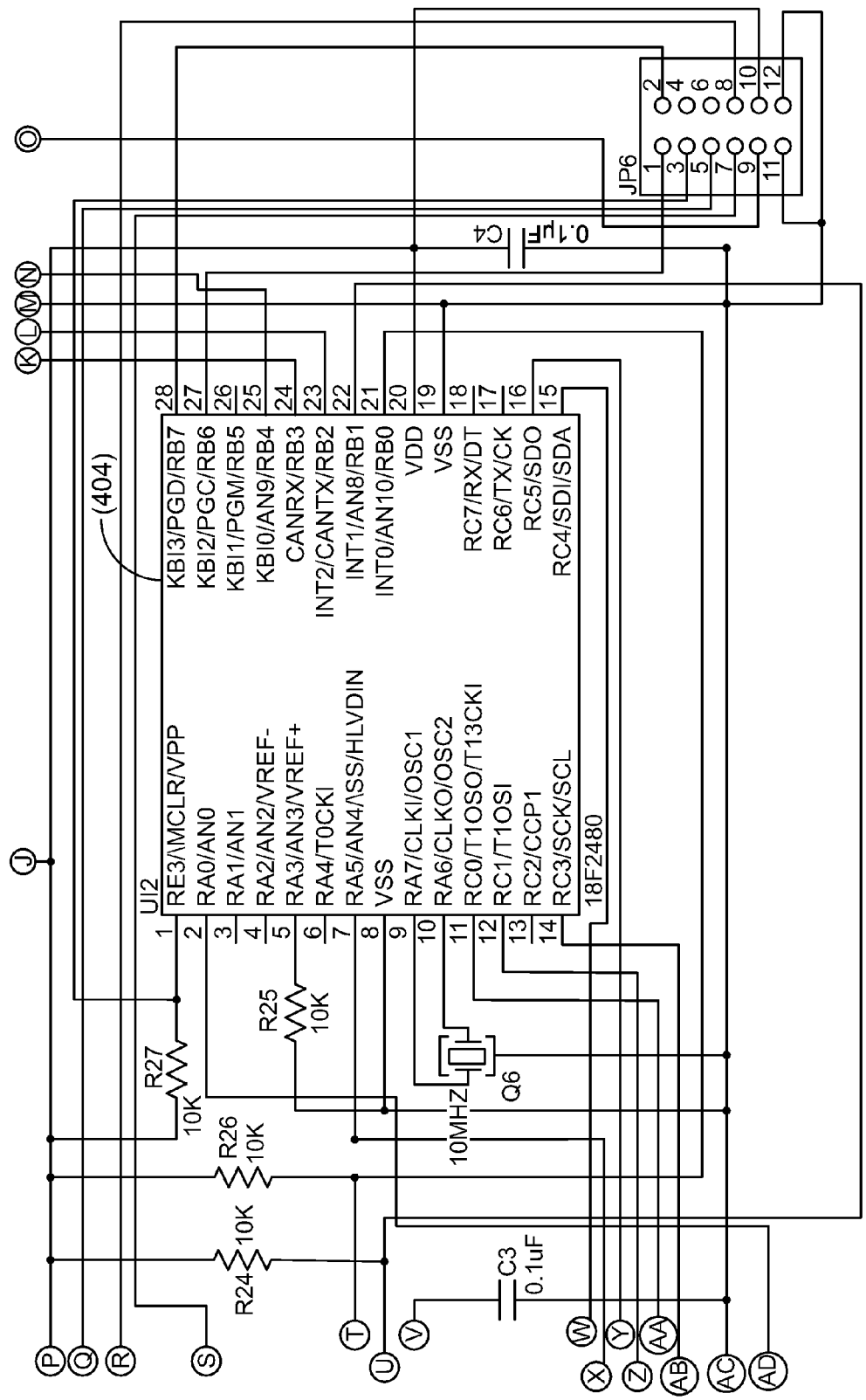

Referring now to FIG. 1, there is illustrated an electronic ignition module emulator 25 which functions to remote start a vehicle. The interface system which can be shown in the electrical schematic of FIG. 5, can also be shown by the flow charts presented in FIGS. 2-4. It is further understood that the present invention can be accomplished by either hardware interface microcontroller or by software. Software may be easily created and installed into the pre-existing vehicle electronic ignition cylinder module. One or more of the present embodiments are embodied in a hardware interface microcontroller that can be is installed in a vehicle. The remote start module receives, sends, as well as modifies data or information from the vehicle electronic ignition cylinder module while it is being routed to other vehicle modules including the engine controller, transmission controller, heater, and air conditioner. For purposes of the present invention, the ignition cylinder module, vehicle network, and vehicle network modules including the engine controller, transmission controller, heater and air conditioning controller would be provided by their respective manufacturers and include their respective components and software.

The remote starter 25, in accordance with an embodiment of the present invention, is placed on the vehicle network by means of a serial data T-Harness (23). The vehicle network normally connects the electronic ignition cylinder module (20) to various other vehicle controllers including an engine controller (33), transmission controller (34), heater/Air conditioner controller (35), and other controllers (36). For the purposes of the embodied invention, the ignition cylinder module (20) is disconnected from the vehicle network and the remote starter module (25) is inserted into the network such that any and all data information originating from the ignition cylinder module (20) is routed along data lines (31) to the remote starter module (25) for modification, if necessary. The modified data is then routed along data lines (32) back into the vehicle network where it reaches all other modules on the vehicle network (33-36). Alternately it is understood that packets may traverse the opposite route, originating at any module on the vehicle network and passing through the invention to reach the remote starter module before re-entering the invention to terminate at the electronic ignition cylinder. The data originating from the ignition cylinder module enters the remote starter at connection point (401) (FIGS. 5A-5B) and similarly the data exits the remote starter at connection point (402). A relay system (400) is employed to provide a passive operation feature: When the remote starter module is not operating it does not need to change vehicle state or modify data on the network so the relay (400) passes the data directly from connection point (401) to connection point (402). When the remote starter is in operation, The relay system (400) disconnects connection points (401) and (402) and instead routes both (401) and (402) to interface controllers (403) where the data is then filtered and modified by the microcontrollers (404).

The remote starter system works by means of two successive modes of operation: The first mode of operation of the embodied invention involves the vehicle user inserting a valid authorized key (24) containing a cryptographic controller into the electronic ignition cylinder (20). The ignition cylinder requests a keycode from the cryptographic controller which is then sent to the engine controller (33) allowing the engine to start. In an alternate embodiment, the electronic ignition cylinder may instead by a push button, known as "push-to-start" or "keyless go" and the cryptographic controller in the key sends the key code to the ignition cylinder using radio frequency transmission. In the embodied invention the remote start module starts with the interrupt relays (400) in the off position (allowing the data to pass through the remote starter module with out modification) as shown in (105). The remote start module monitors the ignition status (110) and continuously checks to see if the vehicle ignition is switched in by the user. If the ignition is turned on (115) then the remote starter monitors the network data, checking if the ignition cylinder has passed the keycode along to the engine controller to allow the vehicle to start (125). If the keycode is detected on the network (130) then the remote starter transfers control to a subroutine which requests, receives, and stores additional valid keycodes for use in remote starting the vehicle (135).

The process subroutine which requests and receives the keycodes initiates by switching the interrupt relays (400) to the 'on' position (300) which means the network data is now routed through the microcontrollers to allow modification of the data. Once the relays are switched, the microcontrollers begin filtering any new keycodes so that they may not pass to other devices on the network (305). This allows additional keycodes to be received for later use. The remote starter module then emulates the engine controller in requesting a new valid keycode from the vehicle key cryptographic controller via the electronic ignition cylinder(310). Once a new keycode is detected and received (315,320) the valid keycode is then stored in nonvolatile memory of the remote starter (325). The remote starter module can store many such keycodes, allowing the vehicle to be remote started many times without a valid key or cryptographic controller being present. The remote starter module then checks how many keycodes have been stored in memory against the total number of allowed keycodes (330,335). If the maximum number of storable keycodes has not been reached then control is passed back to the keycode request stage (310). If the maximum number of allowed keycodes has been reached then the relays (400) are switched off (340) and control is returned to the main process (345). The main process then again checks the state of the vehicle ignition (140). If the vehicle ignition is still in the 'on' position then the process loops back to check the ignition status again (140). When the vehicle ignition is switched off (145) then control is passed back to the initial ignition check (110).

The second mode of operation involves the check of vehicle ignition (110,115). If the vehicle ignition state is 'off' then the process control jumps to the remote start process (120). The remote start process begins by checking for a valid start command issued to the remote starter (200). If a remote start command has not been issued (205) then process control is returned (210) to the main process and ignition status check (110). If the remote start command has been issued (205) then the starter module will check to see if any valid keycodes have been stored in its memory (215). If no valid keycode is found then process control is returned to the main process (220) and the ignition status check (110). If a valid keycode is found to be available (225) then the relays (400) are set to 'on' to allow network data to be routed to the microprocessor for modification and filtering (230). The remote start module then watches for status data sent from the electronic ignition cylinder and modifies the data to indicate that the vehicle ignition should turn 'on' (235) before sending the data on to be read by the engine controller, transmission controller, heater and Air conditioning controller. The remote starter then monitors the vehicle network for a keycode data request originating from the engine controller (240). When the keycode request has been detected (245), the remote start module sends one of the previously stored keycodes to the engine controller (250) and modifies the data originating from the ignition cylinder to indicate that the starter motor should crank and attempt to start the engine. (255). The remote starter then waits about 2 seconds to allow the starter motor sufficient time to engage the engine (260) before modifying the data originating from the key cylinder again to indicate that the engine should run and the heater or air conditioning controller should be powered on (265).

The remote starter then activates an internal countdown timer (270) which sets a maximum time that the vehicle can remain remote started. The remote starter module then checks to see if an remote shutdown command has been received (275) and if so the relays (400) are set to 'off' (285) and the process control is returned to the beginning of the main process. If no shutdown command is received then the remote starter module will check the countdown timer to see if the maximum run time has elapsed (292). If the timer has not run out then control is passed back to the shutdown command check (275). If the timer has run out (294) then the relay (400) is set to 'off' (296) and process control is returned to the beginning of the main process.

Various embodiments will now be discussed in greater detail. In one embodiment there is provided a remote starter system for a vehicle having an electronic ignition module for use with a vehicle key with a cryptographic controller. The electronic ignition module is connected to vehicle controller modules by a serial data interface. The serial data interface has vehicle serial data wires and vehicle power supply wires and the serial data interface has a pair of interconnected vehicle serial data connectors to communicate serial data and power to and from the vehicle controller modules and the electronic ignition module through the vehicle serial data wires and vehicle power supply wires. The remote starter system includes a T-Harness connector having T-Harness serial data wires and T-Harness power supply wires and having at least first, second, and third serial data connectors, the second and third serial data connectors being interconnected between the pair of vehicle serial data connectors. The connection is such that (a) the T-Harness serial data wires are configured to communicate only between the first and second serial data connectors and only between the first and third serial data connectors; and (b) the T-Harness power supply wires being configured to communicate between the first and second serial data connectors, between the first and third serial data connectors, and between the second and third serial data connectors. The remote starter system further includes a remote starter module having at least a remote starter connector, wherein the first serial data connector of the T-Harness connector is coupled to the remote starter connector, such that serial data from the vehicle controller modules and from the ignition module must communication through the remote starter. In addition, the remote starter module having a memory for storing keycodes from the vehicle key such that upon receiving an engine start code, the remote starter module is capable of sending the stored keycodes to one or more vehicle controller modules.

In a further embodiment, there is provided a remote starter system for a vehicle having an electronic ignition module connected to vehicle controller modules by a serial data interface. The electronic ignition module capable of receiving at least one keycode from a cryptographic controller vehicle key for verification before changing the state of at least one vehicle controller module. The remote starter system comprising a remote starter module having at least a memory for storing at least one keycode and having a first means for sending the at least one keycode for verification and having a second means for modifying the state of at least one vehicle controller module, when the at least one keycode is verified. The remote starter system further including a T-Harness connector interconnected between a pair of vehicle serial data connectors and having at least serial data wires configured such that all serial data to and from the vehicle controller modules and the electronic ignition module are communicate through the remote starter module.

In yet another embodiment there is provided a remote starter system for a vehicle having an electronic ignition module connected to vehicle controller modules by a serial data interface. The electronic ignition module capable of receiving at least one keycode from a cryptographic controller vehicle key for verification before changing the state of at least one vehicle controller module. The remote starter system comprising a remote starter module having at least a memory for storing at least one keycode and having a means for sending the at least one keycode for verification and means for requesting modification of a state of at least one vehicle controller module, wherein when the at least one keycode is verified the state of at least one vehicle controller module is modified as requested by the remote starter module.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred by the embodiment or by the claims presented herein.

I claim:

1. A remote starter system for a vehicle having an electronic ignition module for use with a vehicle key with a cryptographic controller, the electronic ignition module being connected to vehicle controller modules by a serial data interface, the serial data interface having vehicle serial data wires and vehicle power supply wires and the serial data interface having a pair of interconnected vehicle serial data connectors to communicate serial data and power to and from the vehicle controller modules and the ignition module through the vehicle serial data wires and vehicle power supply wires, the remote starter system comprising:

a T-Harness connector having T-Harness serial data wires and T-Harness power supply wires and having at least first, second, and third serial data connectors, the second and third serial data connectors being interconnected between the pair of vehicle serial data connectors, wherein:
the T-Harness serial data wires being configured to communicate only between the first and second serial data connectors and only between the first and third serial data connectors, such that all of the serial data to and from the second and third serial data connectors must communicate through the first serial data connector
the T-Harness power supply wires being configured to communicate between the first and second serial data connectors, between the first and third serial data connectors, and between the second and third serial data connectors; and
a remote starter module having at least a remote starter connector, wherein the first serial data connector of the T-Harness connector is coupled to the remote starter connector, wherein all of the serial data from the vehicle controller modules and from the ignition module must communicate through the remote starter module before being communicated to the vehicle controller modules and to the ignition module, and the remote starter module having a memory for storing keycodes from the vehicle key such that upon receiving an engine start code, the remote starter module being configured to send the stored keycodes to one or more vehicle controller modules.

2. The remote starter system of claim 1, wherein the remote starter sends and receives information as data packets to one or more of the following controllers permitting the vehicle to change operation states:
an engine controller, wherein the change in operating state is starting and running the engine;
a transmission controller, wherein the change in operating state is unlocking the transmission permitting vehicle movement; or
a heater/air conditioning controller, wherein the change in operating state is turning on the heater/air conditioning.

3. A remote starter system for a vehicle having an electronic ignition module connected to vehicle controller modules by a serial data interface, the electronic ignition module configured to receive at least one keycode from a cryptographic controller vehicle key for verification before changing the state of at least one vehicle controller module, the remote starter system comprising:
a remote starter module having at least a memory for storing at least one keycode and having a first means for sending the at least one keycode for verification and having a second means for modifying the state of at least one vehicle controller module, when the at least one keycode is verified; and
a T-Harness connector interconnected between a pair of vehicle serial data connectors and having at least serial data wires configured such that all of the serial data to and from the vehicle controller modules and the electronic ignition module are communicated through the remote starter module before being communicated to the vehicle controller modules and to the ignition module.

4. The remote starter system of claim 3, wherein the serial data interface is a serial data bus, CAN BUS, FLEXRAY, LIN or MOST.

5. The remote starter system of claim 3, wherein the vehicle controller modules are an engine controller, heat controller, air conditioning controller, or transmission system controller.

6. The remote starter system of claim 3, wherein the electronic ignition module is an electronic device with a receptacle where an ignition key is inserted to allow access to vehicle functions or a push to start button switch.

7. The remote starter system of claim 3, wherein the T-Harness connector is a break in the serial data lines re-directing the serial data lines to the remote starter system for modification of the data packets.

8. A remote starter system for a vehicle having an electronic ignition module connected to vehicle controller modules by a serial data interface, the electronic ignition module configured to receive a keycode from a plurality of keycodes generated by a cryptographic controller vehicle key for verification before changing the state of at least one vehicle controller module, the remote starter system comprising:
   a remote starter module having at least a memory for storing at least one keycode and having a means for sending the at least one keycode for verification and means for requesting modification of a state of at least one vehicle controller module, wherein when the at least one keycode is verified and the state of at least one vehicle controller module is modified as requested by the remote starter module, said remote starter is positioned between the electronic ignition module and the at least one vehicle controller module such that the remote starter is configured to intercept and further configured to store a plurality of keycodes created by the cryptographic controller vehicle key and for sending one of the keycodes for verification prior to the remote starter module sending a signal to change the state of at least one vehicle controller module.

9. The remote starter module of claim 8 further comprising a T-Harness connector interconnected between a pair of vehicle serial data connectors and having at least serial data wires configured such that all serial data to and from the vehicle controller modules and the electronic ignition module are communicate through the remote starter module.

10. The remote starter module of claim 8, wherein the T-Harness connector further includes T-Harness serial data wires and T-Harness power supply wires and having at least first, second, and third serial data connectors, the second and third serial data connectors being interconnected between a pair of vehicle serial data connectors defined by the serial data interface, wherein:
   the T-Harness serial data wires being configured to communicate only between the first and second serial data connectors and only between the first and third serial data connectors,
   the T-Harness power supply wires being configured to communicate between the first and second serial data connectors, between the first and third serial data connectors, and between the second and third serial data connectors; and
   the remote starter module having at least a remote starter connector, wherein the first serial data connector of the T-Harness connector is coupled to the remote starter connector, and the second and third serial data connectors are separately coupled between the pair of interconnected vehicle serial data connectors, wherein data from the remote starter module is communicated to the vehicle controller modules and the electronic ignition module and wherein all data packets moving between the electronic ignition module and the vehicle controller modules must communicate through the remote starter module.

* * * * *